UNITED STATES PATENT OFFICE.

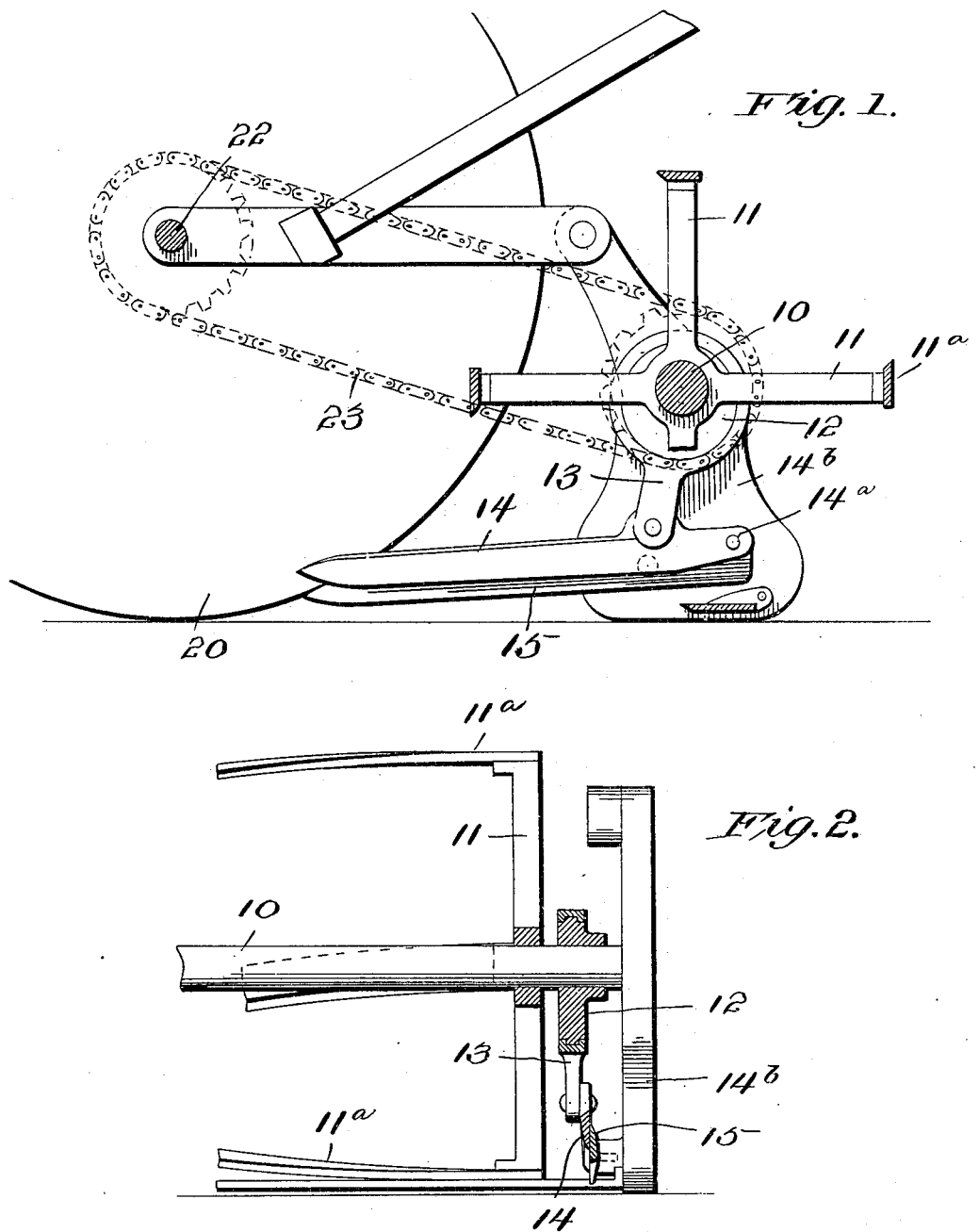

ANDREW JACKSON, OF WINNETKA, ILLINOIS.

LAWN-MOWER.

No. 807,934.  Specification of Letters Patent.  Patented Dec. 19, 1905.

Application filed September 16, 1905. Serial No. 278,714.

*To all whom it may concern:*

Be it known that I, ANDREW JACKSON, a citizen of the United States, residing at Winnetka, in the county of Cook and State of Illinois, have invented new and useful Improvements in Lawn-Mowers, of which the following is a specification.

This invention is an attachment for lawn-mowers designed to trim the grass at the edges of lawns, around walks, flower-beds, and the like. It is attached to and operated by the lawn-mower comprising a pair of shears, one blade of which is fixed and the other of which is movable up and down to effect the purpose.

In the accompanying drawings, Figure 1 is a sectional elevation of a lawn-mower provided with the invention. Fig. 2 is a rear view thereof.

Referring specifically to the drawings, 10 indicates the cutter-shaft of a lawn-mower, upon which are mounted the arms 11, having the usual cutting-blades 11ª. On the end of the shaft 10 is an eccentric 12, having projecting arm 13 attached to one of the blades 14 of the shears. This blade is pivoted at 14ª to the side frame 14ᵇ of the mower. The fixed blade 15 is secured to the frame under or below the blade 14.

When the shaft is rotated, the movement of the eccentric operates the blade 14, producing a cutting action at the edge of the swath, and which when the mower is run along the edge of the lawn will trim the grass at such edge.

The shaft 10 may be driven in any suitable manner. I have illustrated main wheels 20, located forward of the cutter on a shaft 22 and having a sprocket-gear the chain of which is indicated at 23 to drive the shaft 10.

In ordinary operation the shears pass along above the grass; but when applied to the edge of a lawn the outer drive-wheel drops in the bed or in the cut-out place at the edge of a walk or the like, so that the shears are lowered sufficiently to cut off the projecting and irregular edges of the grass.

What I claim as new, and desire to secure by Letters Patent, is—

1. The combination with a lawn-mower having a rotary cutter-shaft, of an edge-trimmer, comprising a pair of shears carried by the mower, one blade of the shears being fixed to the mower-frame and the other being pivoted thereto and operatively connected to the said cutter-shaft.

2. The combination with a lawn-mower having a rotary cutter-shaft, of an edge-trimmer comprising a pair of shears the lower blade of which is fixed to the side frame of the mower and the upper blade is pivoted thereto, and an eccentric on the cutter-shaft of the mower having a strap connected directly to said movable blade.

In testimony whereof I have signed my name to this specification in the presence of two subscribing witnesses.

ANDREW JACKSON.

Witnesses:
 CLARA PROSCHE,
 H. G. BATCHELOR.